Figures 1, 2:
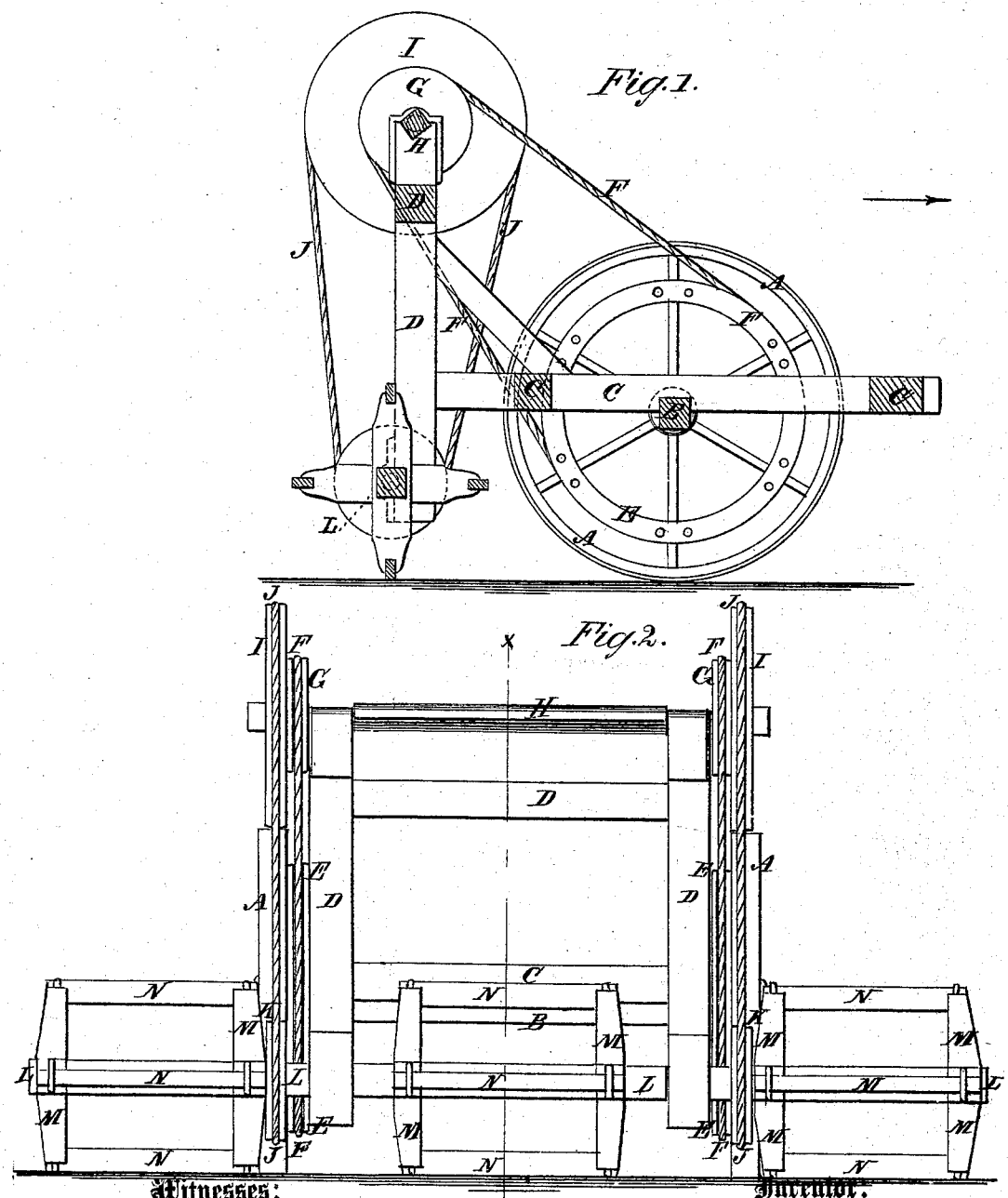

M. M. CARRUTH.
Cotton-Stalk Knockers.

No. 137,825. Patented April 15, 1873.

Witnesses:
John Becker

Inventor:
M. M. Carruth
per
Attorneys.

UNITED STATES PATENT OFFICE.

MARVELL M. CARRUTH, OF HELENA, ARKANSAS.

IMPROVEMENT IN COTTON-STALK KNOCKERS.

Specification forming part of Letters Patent No. 137,825, dated April 15, 1873; application filed December 31, 1872.

*To all whom it may concern:*

Be it known that I, MARVELL MILLS CARRUTH, of Helena, in the county of Phillips and State of Arkansas, have invented a new and useful Improvement in Cotton-Stalk Knocker, of which the following is a specification:

Figure 1 is a detail vertical longitudinal section of my improved machine taken through the line $x\ x$, Fig. 2. Fig. 2 is a rear view of the same.

Similar letters of reference indicate corresponding parts.

My invention is an improvement upon the machine for which Letters Patent were granted to Geo. Gorman, September 20, 1853; and consists in a construction and arrangement of parts, as hereinafter described; the objects aimed at being to isolate the gearing from danger of contact with the cotton-stalks, or to secure free space for the operation of the revolving knocker, and also to secure rapid rotation of the latter from a slow forward movement of the machine over the surface of the ground.

A represents the drive-wheels, which may be ordinary wagon or cart wheels, and which revolve upon the journals of the axle B, which may be the rear axle of a wagon or the axle of a cart. To the axle B is attached a frame, C, to the rear end of which is attached an upright frame, D, as shown in Fig. 1. To the inner sides of the wheels A are secured, by clamps or other convenient means, rings or pulleys E, which are grooved to receive the bands F. The bands F also pass around the small pulleys G attached to the ends of the shaft H, which revolves in bearings in the upper end of the upright frame D. I are large pulleys, formed upon or rigidly connected with the small pulleys G, and around which pass the belts J, which also pass around the smaller pulleys K attached to the shaft L. The shaft L revolves in bearings attached to the lower end of the upright frame D. To the central and end parts of the shaft L are attached sets of radial arms M, to the outer ends of each pair of which is attached a bar, N, as shown in Figs. 1 and 2.

By this construction, as the machine is drawn slowly forward, the shaft L is revolved rapidly, and the bars N strike, knock down, and break into small pieces the cotton-stalks, enabling the plowman to readily cover them with his plow, so that they will fertilize the soil.

Having thus described my invention, I claim as new and desire to secure by Letters Patent—

The shaft H and pulleys G I mounted in the upper ends of the vertical bars D of the frame, the revolving knocker and its pulleys arranged at the lower end of said bars, said parts being connected with each other, and the driving-pulleys E by belts F J, as shown and described, for the purpose specified.

MARVELL MILLS CARRUTH.

Witnesses:
N. RIGHTON,
R. A. MOORE.